(12) United States Patent
Weiss et al.

(10) Patent No.: US 11,140,002 B2
(45) Date of Patent: Oct. 5, 2021

(54) METHOD FOR SWITCHING OFF A COMMUNICATION AND CORRESPONDING COMMUNICATION SYSTEM

(71) Applicant: Robert Bosch GmbH, Stuttgart (DE)

(72) Inventors: Guenter Weiss, Walheim (DE); Kevin Haist, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/691,735

(22) Filed: Nov. 22, 2019

(65) Prior Publication Data

US 2020/0169430 A1 May 28, 2020

(30) Foreign Application Priority Data

Nov. 28, 2018 (DE) .......................... 102018220398.9

(51) Int. Cl.
*H04L 12/40* (2006.01)
*H04L 12/12* (2006.01)
*H04L 12/26* (2006.01)

(52) U.S. Cl.
CPC ........ *H04L 12/40032* (2013.01); *H04L 12/12* (2013.01); *H04L 43/0817* (2013.01)

(58) Field of Classification Search
CPC ............. H04L 2209/80; H04L 25/4902; H04L 7/0331
See application file for complete search history.

(56) References Cited

U.S. PATENT DOCUMENTS 8,677,172 B2 * 3/2014 Anderson ........ G01R 31/31709
713/500
9,471,121 B2 * 10/2016 Saha .......................... G06F 1/26
10,740,172 B2 * 8/2020 Takahashi ........... G06F 13/4291

* cited by examiner

*Primary Examiner* — Chandrahas B Patel
(74) *Attorney, Agent, or Firm* — Norton Rose Fulbright US LLP; Gerard Messina

(57) ABSTRACT

A method is described for switching off a communication between at least two bus subscribers, which are connected to one another via a data bus and which transmit during the communication respectively one transmission clock signal in addition to a data signal, at least one of the bus subscribers generating its transmission clock signal and its data signal based on a reference clock signal, as well as a corresponding communication system. In the case of a fault, the reference clock signal is switched off so that the at least one affected bus subscriber no longer transmits a transmission clock signal and no longer transmits a data signal, and the faulty communication is switched off.

9 Claims, 2 Drawing Sheets

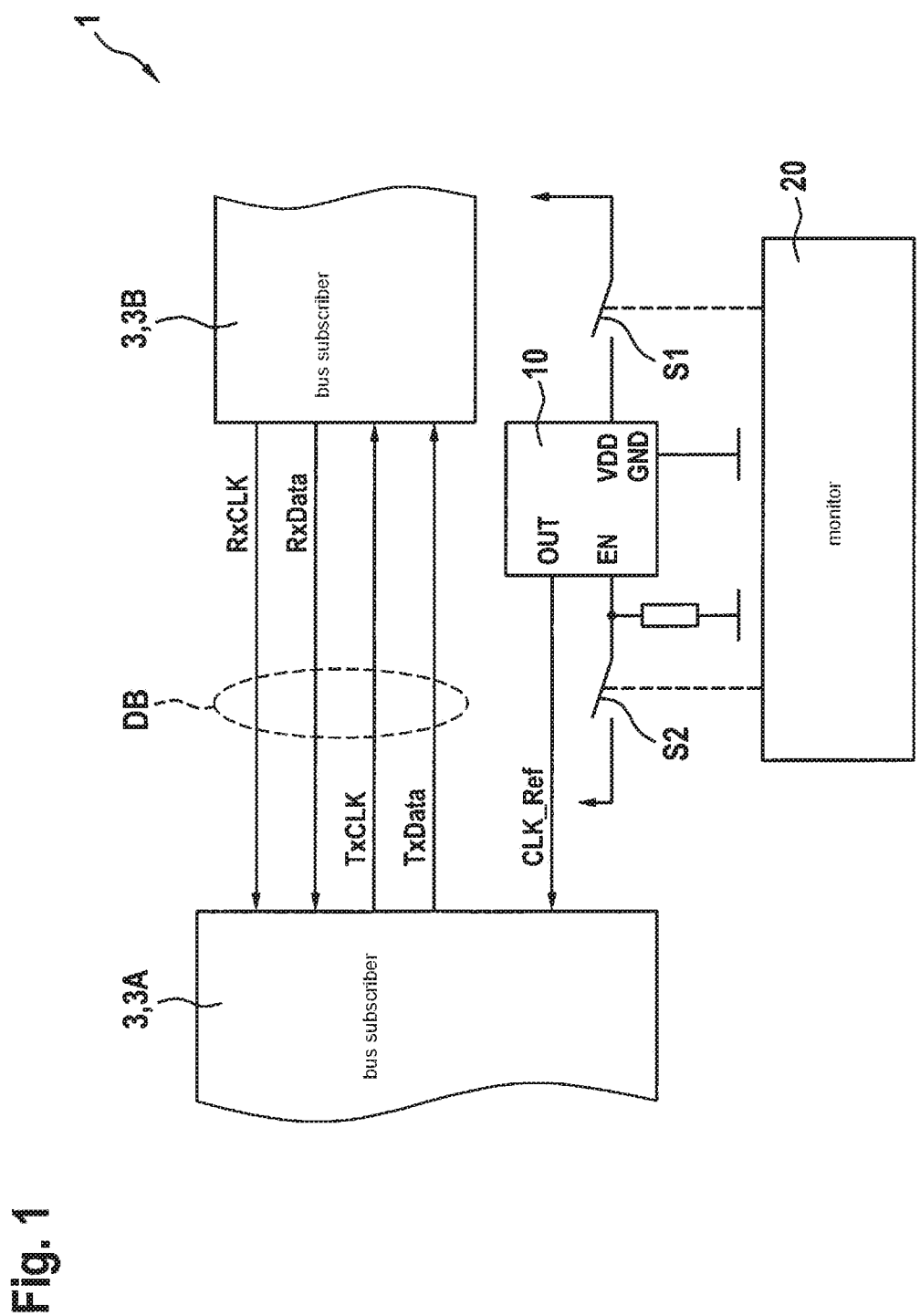

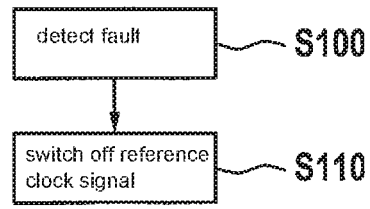

METHOD FOR SWITCHING OFF A COMMUNICATION AND CORRESPONDING COMMUNICATION SYSTEM

CROSS REFERENCE

The present application claims the benefit under 35 U.S.C. § 119 of German Patent Application No. DE 102018220398.9 filed on Nov. 28, 2018, which is expressly incorporated herein by reference in its entirety.

FIELD

The present invention relates to a method for switching off a communication and a corresponding communication system, which implements the method.

BACKGROUND INFORMATION

Some conventional vehicles are have communication systems that respectively have at least two bus subscribers connected to one another via a data bus. The bus subscribers communicate with one another and exchange data in the process. For this purpose, it is possible to transmit, in addition to a data signal, a transmission clock signal, at least one of the bus subscribers being able to generate its transmission clock signal and its data signal based on a reference clock signal.

One of the essential safety objectives of such bus subscribers is that no corrupt or invalid data are transmitted to other bus subscribers. In conventional methods for switching off a communication, the individual bus subscribers or individual transmission lines may be reset or switched off. When switching off the complete bus subscriber, it may be seen as disadvantageous that all interfaces of the bus subscriber are switched off rather than only an interface of the bus subscriber that operates in a faulty manner. When switching off individual transmission lines, it may be seen as disadvantageous that, specifically in high frequency types of transmissions, the influence of components that are connected to the transmission lines is particularly critical. These components influence the signal to be transmitted not only while the communication is to be interrupted, but also during the deliberate transmission.

SUMMARY

An example method for switching off a communication in accordance with the present invention, as well as a corresponding example communication system may have the advantage that a switch-off does not occur directly on the data lines or clock lines. As a result, the transmission lines are advantageously not negatively influenced by additionally connected components during the transmission. By switching off the reference clock signal, the corresponding bus subscriber is no longer able to generate and transmit valid data.

The example method according to the present invention for switching off a communication may be used independently of the reset functions of the individual bus subscribers. Moreover, individual interfaces of a bus subscriber may be switched off selectively, instead of deactivating all interfaces using a reset signal. For the respective bus subscriber there is thus no reduced availability on the other interfaces. It is possible to use different switch-off functions or switch-off devices for each interface in order to switch off the communication, instead of using only one switch-off function or switch-off device that switches off the communication.

Specific embodiments of the present invention provide a method for switching off a communication between at least two bus subscribers, which are connected to one another via a data bus and transmit during the communication respectively a transmission clock signal in addition to a data signal, at least one of the bus subscribers generating its transmission clock signal and its data signal based on a reference clock signal. In the case of a fault, the reference clock signal is switched off so that the at least one affected bus subscriber no longer transmits a transmission clock signal and no longer transmits a data signal, and the faulty communication is switched off.

In addition, a communication system having at least two bus subscribers connected to one another via a data bus is provided, which is designed to implement the method of the present invention for switching off a communication.

In the present context, a bus subscriber may be understood as an electrical device such as a control unit for example, which processes or evaluates detected sensor signals. Such a bus subscriber may have at least one interface, which may be developed as hardware and/or software. In a hardware embodiment, the interfaces may be part of a so-called system ASIC for example, which includes the most varied functions of the bus subscriber. However, it is also possible for the interfaces to be separate, integrated circuits or to be at least partially made up of discrete components. In a software embodiment, the interfaces may be software modules that exist for example on a microcontroller in addition to other software modules. Another advantage is a computer program product which has program code stored on a machine-readable medium such as a semiconductor memory, a hard-disk memory or an optical memory, and which is used for performing the evaluation when the program is executed by the bus subscriber.

The measures and further developments described herein may render possible advantageous improvements of the example method in accordance with the present invention for switching off a communication and of the communication system in accordance with the present invention.

It is particularly advantageous if for switching off the reference clock signal, a corresponding reference clock oscillator is switched off. To switch off the reference clock oscillator, it is possible for example to switch off a supply voltage of the reference clock oscillator and/or an enable signal of the reference clock oscillator.

In an advantageous development of the communication system in accordance with the present invention, an external reference clock oscillator is able to generate the reference clock signal and to provide it to the at least one bus subscriber.

In another advantageous development of the example communication system in accordance with the present invention, a monitoring function is able to detect a faulty communication and to switch off the faulty communication. For this purpose, the monitoring function is able to detect the faulty communication for example by redundantly checking the transmitted data. This means that the transmitted data are received by various bus subscribers so that the higher-order monitoring function is able to compare the data received from various bus subscribers and to detect a faulty transmission.

In another advantageous development of the communication system in accordance with the present invention, the monitoring function is able to switch off a supply voltage of the reference clock oscillator via a first switch. The reference clock generator is thereby switched off completely, which results in a lower energy consumption. Alternatively, the monitoring function is able to switch off an enable signal of the reference clock oscillator via a second switch so that the reference oscillator no longer outputs the reference clock signal. This offers the advantage that the reference clock signal, which the reference clock oscillator continues to generate, may be output again in a simple and quick manner.

An exemplary embodiment of the present invention is depicted in the figures and explained in greater detail in the description below. In the figures, identical reference symbols indicate components or elements that perform identical or analogous functions.

BRIEF DESCRIPTION OF THE DRAWINGS

FIG. 1 shows a schematic block diagram of an exemplary embodiment of a communication system according to the present invention.

FIG. 2 shows a schematic flow chart of an exemplary embodiment of a method of the present invention for switching off a communication between at least two bus subscribers.

DETAILED DESCRIPTION OF EXAMPLE EMBODIMENTS

As FIG. 1 shows, the exemplary embodiment of an example communication system 1 according to the present invention comprises at least two bus subscribers 3, 3A, 3B connected to one another via a data bus DB. As FIG. 1 further shows, during the communication, bus subscribers 3, 3A, 3B respectively transmit a transmission clock signal TxCLK, RxCLK in addition to a data signal TxData, RxData. This means that a first bus subscriber 3A transmits a first data signal TxData and a corresponding first transmission clock signal TxCLK to a second bus subscriber 3B. In addition, the second bus subscriber 3B transmits a second data signal RxData and a corresponding second transmission clock signal RxCLK to the first bus subscriber 3A. Moreover, in the exemplary embodiment shown, first bus subscriber 3A is connected to an external reference oscillator 10, which provides the first bus subscriber with a generated reference clock signal CLK_Ref. On this basis, first bus subscriber 3A generates its transmission clock signal TxCLK and its data signal TXData based on reference clock signal CLK_Ref.

As FIG. 1 also shows, a monitoring function 20 detects a faulty communication and switches the faulty communication off. Preferably, monitoring function 20 detects a faulty communication by redundantly checking the transmitted data.

As may be seen further from FIG. 1, the depicted exemplary embodiment of communication system 1 has two different options for switching off the communication. Thus, monitoring function 20 is able to switch off a supply voltage VDD of reference clock oscillator 10 via a first switch S1. The reference clock oscillator 10 is thereby deactivated completely so that it no longer generates the reference clock signal CLK_Ref. In addition, in the exemplary embodiment shown, monitoring function 20 is able to switch off an enable signal EN of reference clock oscillator 10 via a second switch S2. This only prevents the output of reference clock signal CLK_Ref at the output OUT of reference clock oscillator 10, while reference clock oscillator 10 continues to generate reference clock signal CLK_Ref. According to the method 100 of the present invention for switching off a communication between at least two bus subscribers 3, 3A, 3B, which are connected to one another via a data bus DB and which respectively transmit, in addition to a data signal TxData, RxData, a transmission clock signal TxCLK, RxCLK, at least one of the bus subscribers 3A generating its transmission clock signal TxCLK and its data signal TxData based on a reference clock signal CLK_Ref, the reference clock signal CLK_Ref being switched off in case of a fault so that the at least one affected bus subscriber 3A no longer transmits a transmission clock signal TxCLK and no longer transmits a data signal TxData, and the faulty communication is switched off. As shown in FIG. 2, the case of a fault is detected in step S100 so that in step S110 the reference clock signal CLK_Ref is switched off.

In the exemplary embodiment shown, reference clock signal CLK_Ref is switched off by switching off a corresponding reference clock oscillator 10. It is possible to switch off reference clock oscillator 10 by switching off a supply voltage VDD of reference clock oscillator 10. Alternatively, it is possible to switch off reference clock oscillator 10 by switching off an enable signal EN of reference clock oscillator 10.

In the exemplary embodiment shown, only first bus subscriber 3A generates its transmission clock signal TxCLK and its data signal TXData based on reference clock signal CLK_Ref. In an exemplary embodiment that is not shown, the second bus subscriber 3B also generates its transmission clock signal RxCLK and its data signal RxData based on a reference clock signal CLK_Ref, which is generated by a second reference clock oscillator 10.

What is claimed is:

1. A method for switching off a communication between at least two bus subscribers, which are connected to one another via a data bus, the method comprising:
   transmitting, by the at least two bus subscribers, during the communication, respectively one transmission clock signal in addition to a data signal, wherein at least one of the bus subscribers generates its transmission clock signal and its data signal, based on a reference clock signal;
   determining a fault in the communication;
   switching off, based on determining the fault, the reference clock signal so that the at least one of the bus subscribers no longer transmits a transmission clock signal and no longer transmits a data signal, and the faulty communication is switched off;
   wherein reference clock signal is switched off by switching off a corresponding reference clock oscillator, and wherein one of the following is satisfied:
   (i) the reference clock oscillator is switched off by switching off a supply voltage of the reference clock oscillator, or
   (ii) the reference clock oscillator is switched off by switching off an enable signal of the reference clock oscillator.

2. The method as recited in claim 1, wherein the reference clock oscillator is switched off by switching off the enable signal of the reference clock oscillator.

3. The method as recited in claim 1, wherein the reference clock oscillator is switched off by switching off the supply voltage of the reference clock oscillator.

4. A communication system, comprising:
   at least two bus subscribers connected to one another via a data bus, the communication system being configured to switch off a communication between the at least two bus subscribers, the at least two bus subscribers transmitting, during the communication, respectively one transmission clock signal and a data signal, at least one of the bus subscribers generating, its transmission clock signal and its data signal, based on a reference clock signal, the communication system further configured to determine a fault in the communication, and, based on determining the fault, switch off the reference clock signal so that the at least one of the bus subscribers no longer transmits a transmission clock signal and no longer transmits a data signal, and the faulty communication is switched off;

wherein one of the following is satisfied:
  (i) the monitoring function switches off a supply voltage of the reference clock oscillator via a first switch, or
  (ii) the monitoring function switches off an enable signal of the reference clock oscillator via a second switch.

5. The communication system as recited in claim 4, wherein an external reference clock oscillator generates the reference clock signal and provides the reference clock signal to the at least one bus subscriber.

6. The communication system as recited in claim 4, wherein a monitoring function detects the faulty communication and switches off the faulty communication.

7. The communication system as recited in claim 6, wherein the monitoring function switches off the enable signal of the reference clock oscillator via the second switch.

8. The communication system as recited in claim 6, wherein the monitoring function detects a faulty communication by redundantly checking the transmitted data.

9. The communication system as recited in claim 6, wherein the monitoring function switches off the supply voltage of the reference clock oscillator via the first switch.

* * * * *